(12) United States Patent
Lee et al.

(10) Patent No.: US 7,860,718 B2
(45) Date of Patent: Dec. 28, 2010

(54) APPARATUS AND METHOD FOR SPEECH SEGMENT DETECTION AND SYSTEM FOR SPEECH RECOGNITION

(75) Inventors: Soo Jong Lee, Daejeon (KR); Sang Hun Kim, Daejeon (KR); Young Jik Lee, Daejeon (KR); Eung Kyeu Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1058 days.

(21) Appl. No.: 11/633,270

(22) Filed: Dec. 4, 2006

(65) Prior Publication Data

US 2007/0136071 A1 Jun. 14, 2007

(30) Foreign Application Priority Data

Dec. 8, 2005 (KR) ...................... 10-2005-0120040
Jul. 10, 2006 (KR) ...................... 10-2006-0064262

(51) Int. Cl.
*G10L 21/06* (2006.01)

(52) U.S. Cl. ...................... 704/276; 704/270; 704/254; 704/223; 704/233; 704/241

(58) Field of Classification Search ................ 704/270, 704/276, 208, 253, 241, 254, 223, 211, 233
See application file for complete search history.

(56) References Cited

U.S. PATENT DOCUMENTS

| | | | | |
|---|---|---|---|---|
| 4,975,960 A * | 12/1990 | Petajan | ...................... | 704/251 |
| 5,473,726 A * | 12/1995 | Marshall | ...................... | 704/231 |
| 6,028,960 A * | 2/2000 | Graf et al. | ...................... | 382/203 |
| 6,185,529 B1 * | 2/2001 | Chen et al. | ...................... | 704/251 |
| 6,272,465 B1 * | 8/2001 | Hewitt et al. | ................. | 704/258 |
| 6,396,954 B1 * | 5/2002 | Kondo | ...................... | 382/224 |
| 6,471,420 B1 * | 10/2002 | Maekawa et al. | ........... | 704/250 |
| 6,487,531 B1 * | 11/2002 | Tosaya et al. | ............... | 704/246 |
| 6,567,775 B1 * | 5/2003 | Maali et al. | ................. | 704/231 |
| 6,754,373 B1 * | 6/2004 | de Cuetos et al. | ........... | 382/118 |
| 6,964,023 B2 * | 11/2005 | Maes et al. | ................. | 715/811 |

(Continued)

FOREIGN PATENT DOCUMENTS

JP 06301393 10/1994

(Continued)

OTHER PUBLICATIONS

Satoshi Tamura; "A Study on Robust Audio-Visual Speech recognition" Tokyo Institute of Technology, Feb. 2005.

*Primary Examiner*—Vijay B Chawan
(74) *Attorney, Agent, or Firm*—Ladas & Parry LLP

(57) ABSTRACT

Provided are an apparatus and method for speech segment detection, and a system for speech recognition. The apparatus is equipped with a sound receiver and an image receiver and includes: a lip motion signal detector for detecting a motion region from image frames output from the image receiver, applying lip motion image feature information to the detected motion region, and detecting a lip motion signal; and a speech segment detector for detecting a speech segment using sound frames output from the sound receiver and the lip motion signal detected from the lip motion signal detector. Since lip motion image information is checked in a speech segment detection process, it is possible to prevent dynamic noise from being misrecognized as speech.

12 Claims, 4 Drawing Sheets

U.S. PATENT DOCUMENTS

| | | | |
|---|---|---|---|
| 7,219,062 B2 * | 5/2007 | Colmenarez et al. | 704/270 |
| 7,269,560 B2 * | 9/2007 | Hershey et al. | 704/270 |
| 7,684,982 B2 * | 3/2010 | Taneda | 704/233 |
| 2002/0116197 A1 * | 8/2002 | Erten | 704/273 |
| 2002/0135618 A1 * | 9/2002 | Maes et al. | 345/767 |
| 2002/0194005 A1 * | 12/2002 | Lahr | 704/271 |
| 2003/0144844 A1 * | 7/2003 | Colmenarez et al. | 704/273 |
| 2006/0224382 A1 * | 10/2006 | Taneda | 704/233 |

FOREIGN PATENT DOCUMENTS

| | | |
|---|---|---|
| JP | 2002-091466 A | 3/2002 |
| JP | 2004-271620 A | 9/2004 |
| JP | 2004-310047 A | 11/2004 |
| KR | 1020020068235 | 8/2002 |
| KR | 1020040053878 | 6/2004 |
| KR | 1020050015585 | 2/2005 |

* cited by examiner

APPARATUS AND METHOD FOR SPEECH SEGMENT DETECTION AND SYSTEM FOR SPEECH RECOGNITION

CROSS-REFERENCE TO RELATED APPLICATION

This application claims priority to and the benefit of Korean Patent Application Nos. 2005-120040, filed Dec. 8, 2005, and 2006-64262, filed Jul. 10, 2006, the disclosures of which are incorporated herein by reference in their entirety.

BACKGROUND

1. Field of the Invention

The present invention relates to an apparatus and method for speech segment detection and a system for speech recognition that combine an image signal and a sound signal to detect a speech segment.

2. Discussion of Related Art

Speech recognition is a sequential process that analyzes features of a sound signal corresponding to speech and converts the sound signal into characters using a computer. A main process of speech recognition can be broken down into a preprocess step, a search step, and a post-process step.

First, a sound signal is input through a speech input device. In the preprocess step, a beginning point and end point of speech (a speech segment) is detected (end point detection (EPD)) from the input sound signal, and then sound features are extracted.

Subsequently, in the search step, a previously prepared sound model and pronouncing dictionary are searched, phonemes having similar features to those extracted in the preprocess step are found out, and the phonemes are combined into a word or a sentence. Then, in order to reduce errors in the search result, the post-process step of applying a language model is performed.

The above speech recognition process will be described in detail below with reference to FIG. 1.

FIG. 1 is a flowchart showing a method for speech recognition in a conventional speech recognition system.

Referring to FIG. 1, when a sound signal is received in step 100, the speech recognition system frames the received sound signal in step 102.

Then, in step 104, the speech recognition system removes stationary noise from the sound signal frame by frame. More specifically, the speech recognition system eliminates high-frequency components by performing frame-specific low-pass filtering.

Next, in step 106, the speech recognition system determines whether or not absolute energy is large and a zero-crossing rate is small according to frames from which stationary noise is removed. More specifically, the speech recognition system determines that the corresponding frame is noise when the absolute energy is small or the zero-crossing rate is large, and that the corresponding frame is a speech frame when the absolute energy is large and the zero-crossing rate is small.

When the absolute energy of the corresponding frame is large and the zero-crossing rate is small, as a result of the determination of step 106, the speech recognition system determines that the corresponding frame is a speech frame in step 108.

Subsequently, the speech recognition system determines whether or not speech frames continue for at least a predetermined number of frames in step 110.

When it is determined that speech frames continue for at least the predetermined number of frames, the speech recognition system determines that a segment corresponding to the frames is a speech segment in step 112.

Then, the speech recognition system extracts a feature vector from the determined speech segment in step 114, and performs speech recognition using the extracted feature vector in step 116.

More specifically, the speech recognition system searches a sound model and a pronouncing dictionary, finds out phonemes similar to the extracted feature vector, and combines the phonemes into a word or a sentence. Then, the speech recognition system performs speech recognition with a language model applied so as to reduce errors in the combined word or sentence.

When it is determined that the absolute energy of the corresponding frame is not large or the zero-crossing rate is not small, the speech recognition system determines that the corresponding frame is noise in step 118, and performs step 104.

When it is determined in step 110 that speech frames do not continue for at least the predetermined number of frames, the speech recognition system determines that the corresponding frame is noise in step 118, and performs step 104.

The daily environment in which speech recognition can be performed through the above-described process is filled with a variety of noise such as surrounding noise, channel noise in a computer, and noise in a communication network.

Therefore, speech segment detection, a necessary initial part of the entire speech recognition process, directly affects recognition rate.

However, since the above-described conventional speech segment detection method fundamentally utilizes a level of sound energy, a zero-crossing rate and continuity of an input signal as main parameters, it is hard to distinguish speech from noise.

In addition, speech segment detection starts with a check of whether or not an input signal has sound energy, but speech and noise both have sound energy, and thus it is hard to distinguish speech from noise.

In addition, a stationary noise removal technique characterized by a uniform level of sound energy and a high frequency is frequently used, but there is no technique capable of distinguishing speech from dynamic noise.

In addition, since dynamic noise is not removed but classified as a speech segment and handed over to a speech recognition process, resources are consumed unnecessarily and speech recognition errors occur.

SUMMARY OF THE INVENTION

The present invention is directed to an apparatus and method for speech segment detection and a system for speech recognition that are capable of efficiently removing dynamic noise that is proposed as a main factor of speech recognition errors in a real environment in which various noise exists.

The present invention is also directed to an apparatus and method for speech segment detection and a system for speech recognition that classify sound energy input in a state in which there is no lip motion as noise, prevent noise from being detected as a speech segment, and are capable of reducing errors in speech recognition.

One aspect of the present invention provides an apparatus for speech segment detection including a sound receiver and an image receiver, comprising: a lip motion signal detector for detecting a motion region from image frames output from the image receiver, applying lip motion image feature information to the detected motion region, and detecting a lip motion signal; and a speech segment detector for detecting a speech segment using sound frames output from the sound receiver and the lip motion signal detected from the lip motion signal detector.

Another aspect of the present invention provides a method for speech segment detection in a speech recognition system including a sound receiver and an image receiver, comprising the steps of: removing stationary noise from a sound frame output from the sound receiver, and determining whether or not the sound frame from which the noise is removed is a potential speech frame; when it is determined that the sound frame is a potential speech frame, determining whether or not a lip motion signal is detected from image frames at a point of time when the potential speech frame is detected; when it is determined that the lip motion signal is detected from the image frames, determining that the potential speech frame is a speech frame, storing the speech frame, and determining whether or not the number of speech frames is at least a predetermined number; and when it is determined that the number of speech frames is at least the predetermined number, detecting the speech frames as a speech segment.

The step of determining whether or not a lip motion signal is detected from image frames at a point of time when the potential speech frame is detected may include the steps of: comparing pixel values of a current frame with respective pixel values of a previous frame among the continuously received image frames, and detecting a motion region; obtaining information on an area, width, length, and position of each detected motion region; and applying lip motion image feature information to the obtained features of the motion region, determining whether or not the detected motion region is a lip motion region, and generating the lip motion signal according to the result of the determination.

Here, the step of applying lip motion image feature information to the obtained features of the motion region, determining whether or not the detected motion region is a lip motion region, and detecting a lip motion signal according to the result of the determination may include the steps of: comparing the obtained features of the motion region with the lip motion image feature information and calculating a degree of similarity; and when the calculated degree of similarity is a predetermined value or more, determining that the motion region is the lip motion region, and generating the lip motion signal.

Yet another aspect of the present invention provides a system for speech recognition, comprising: a sound receiver for converting a sound signal input by a user into a digital signal and framing the digital signal; an image receiver for framing an image signal obtained by an image recorder; a lip motion signal detector for detecting a motion region from the image frames output from the image receiver, applying lip motion image feature information to the detected motion region, and detecting a lip motion signal; a speech segment detector for detecting a speech segment using the sound frames output from the sound receiver and the lip motion signal detected by the lip motion signal detector; a feature vector extractor for extracting a feature vector from the speech segment detected by the speech segment detector; and a speech recognizer for performing speech recognition using the feature vector extracted by the feature vector extractor.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF EXEMPLARY EMBODIMENTS

Hereinafter, exemplary embodiments of the present invention will be described in detail. However, the present invention is not limited to the exemplary embodiments disclosed below and can be implemented in various forms. Therefore, the present exemplary embodiments are provided for complete disclosure of the present invention and to fully inform those of ordinary skill in the art of the scope of the present invention.

Figure 1:
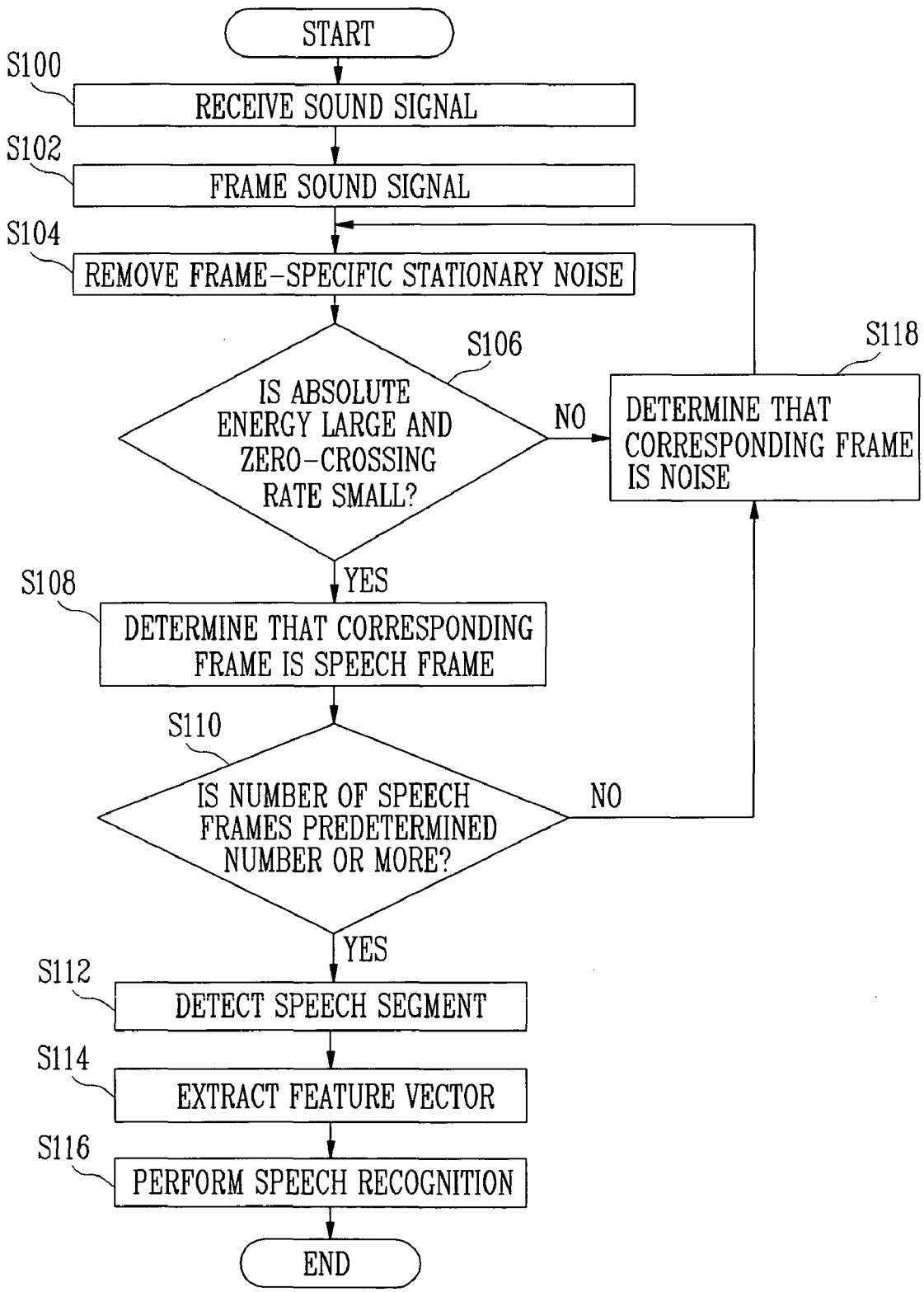
FIG. 1 is a flowchart showing a method for speech recognition in a conventional speech recognition system.
Figure 2:
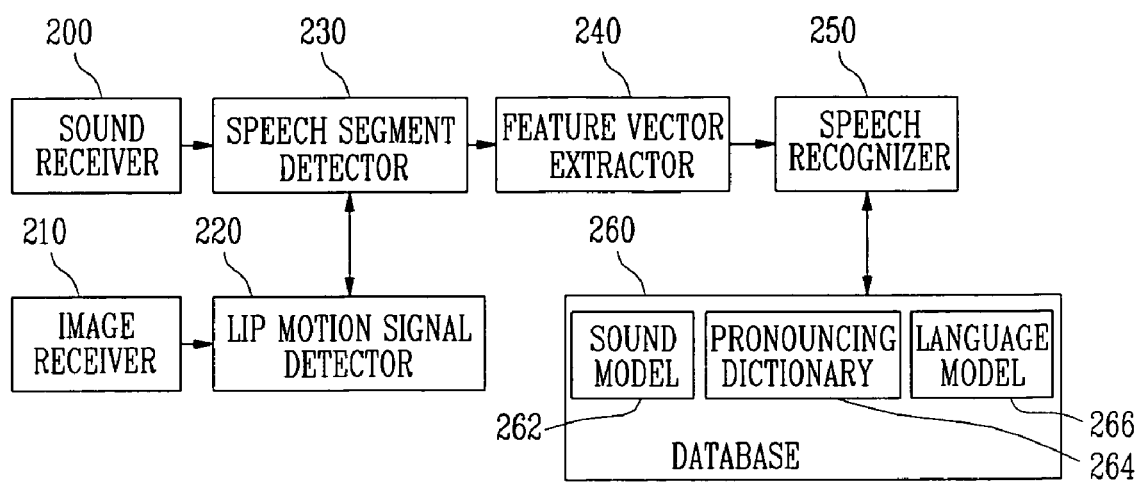
FIG. 2 is a block diagram of a speech recognition system for speech segment detection according to an exemplary embodiment of the present invention.

FIG. 2 is a block diagram of a speech recognition system for speech segment detection according to an exemplary embodiment of the present invention.

Referring to FIG. 2, the speech recognition system comprises a sound receiver 200, an image receiver 210, a lip motion signal detector 220, a speech segment detector 230, a feature vector extractor 240, a speech recognizer 250, and a database 260.

The sound receiver 200 converts a sound signal that is input by a user through a microphone, etc. into a digital sound signal, and then frames and transfers the digital sound signal to the speech segment detector 230.

The image receiver 210 frames an image signal obtained by an image taking apparatus such as a camera, and transfers the image frames to the lip motion signal detector 220.

The lip motion signal detector 220 compares frames of the image information input from the image receiver 210 frame by frame with each other, detects a motion region, removes minute image noise, then applies lip motion image feature information to the motion region from which noise is removed, and generates a lip motion signal in real time. Here, the lip motion image feature information has been previously stored, and includes a size, horizontal length, vertical length, width/length ratio, position, etc. of the lips.

More specifically, the lip motion signal detector 220 compares each pixel value of a previous image frame with a corresponding pixel value of a current image frame, and distinguishes between a part at which there is a difference in pixel value and a part at which there is no difference in pixel value. Then, the lip motion signal detector 220 removes a minute noise image from the part at which there is a difference in pixel value and applies a critical value to the part, thereby detecting a motion region. Here, since the part at which there is a difference in pixel value includes a minute noise image, motion of something other than lips, and lip motion, the lip motion signal detector 220 removes the minute noise from the part at which there is a difference in pixel value and applies the critical value to the part, thereby detecting the motion region.

For example, the pixel may be changed to white color (pixel value: 255) when a difference in pixel value is 10 or more, and to black color (pixel value: 0) when a difference is less than 10, so that the pixel can be visually checked with ease. A white region is determined to be a motion region.

Therefore, white color is shown at the position of eyes when the eyes move, in the lips when the lips move, and at a jaw motion part when the jaw moves.

Then, the lip motion signal detector 220 obtains features of a size, horizontal length, vertical length, width/length ratio, position, etc. of the white (motion) region, and compares the obtained features with previously stored lip motion image feature information.

When the comparison yields a high degree of similarity, the white region is determined to be a lip motion region. On the contrary, when there is not a high degree of similarity, it is determined that the white region is another motion region other than a lip motion region or that there is no motion.

The degree of similarity, e.g., 0.3, 0.4, . . . , 0.9, is stored in a shared memory space and used as data for determining whether or not a sound signal is speech.

As described above, the lip motion signal detector 220 compares the motion region of the image frames with the lip motion feature information such as a shape of lips and a change in the shape, i.e., a width and area of a lip feature point, changes therein according to time, and so on, and determines whether or not there is lip motion.

Then, the lip motion signal detector 220 generates a lip motion signal according to the determination result and transfers the generated signal to the speech segment detector 230.

The speech segment detector 230 detects a speech segment using the sound signal input from the sound receiver 200 and the lip motion signal generated by the lip motion signal detector 220.

More specifically, the speech segment detector 230 removes stationary noise characterized by a uniform level and a high frequency from a sound frame output from the sound receiver 200, analyzes a level of absolute energy and a zero-crossing rate of each sound frame having residual energy, and determines whether the sound frame is a potential speech frame or noise. Here, the zero-crossing rate is the number of times that a sound signal crosses a zero-base, is regarded as the meaning of frequency, and generally has a low value for a voice and a high value for sound other than a voice.

Therefore, the speech segment detector 230 determines that the sound frame is noise when the absolute energy is small or the zero-crossing rate is large, and that the sound frame is a potential speech frame when the absolute energy is large and the zero-crossing rate is small.

Then, the speech segment detector 230 determines whether or not a segment corresponding to the sound frame determined to be a potential speech frame is a speech segment using the lip motion signal generated by the lip motion signal detector 220.

In other words, the speech segment detector 230 determines whether or not the lip motion signal corresponding to image frames is generated by the lip motion signal detector 220 at the point of time when the potential speech frame is detected.

When it is determined that there is no lip motion signal corresponding to image frames at the point of time when the potential speech frame is detected, the speech segment detector 230 determines that the potential speech frame is dynamic noise. On the contrary, when there is a lip motion signal, the speech segment detector 230 determines that the potential speech frame is a speech frame and stores it.

Then, when the number of stored speech frames is a predetermined number or more, the speech segment detector 230 marks an initial frame of the corresponding speech frames as a beginning point of a speech segment, and continuously makes speech frames that are input thereafter progress to a speech recognition process.

When a state in which a speech frame is not input continues during the above-described process, the speech segment detector 230 marks an end point of a speech segment and detects the speech segment.

The feature vector extractor 240 extracts a feature vector from the speech segment detected by the speech segment detector 230, and transfers it to the speech recognizer 250.

The speech recognizer 250 performs a Viterbi search that selects the most similar words to words registered in the database 260 using the feature vector extracted by the feature vector extractor 240. Here, a Hidden Markov Model (HMM) can be used, which means a method of comparing differences between an HMM that has been previously trained and built and feature data of currently input speech, and determining the most similar word among words proposed to be recognized.

Then, the speech recognizer 250 searches a sound model 262 and a pronouncing dictionary 264, finds out phonemes having similar sound features to extracted sound features, and combines the phonemes into a word or sentence.

Subsequently, the speech recognizer 250 performs speech recognition with a language model 266 applied so as to reduce errors in the combined and generated word or sentence.

Figure 3:
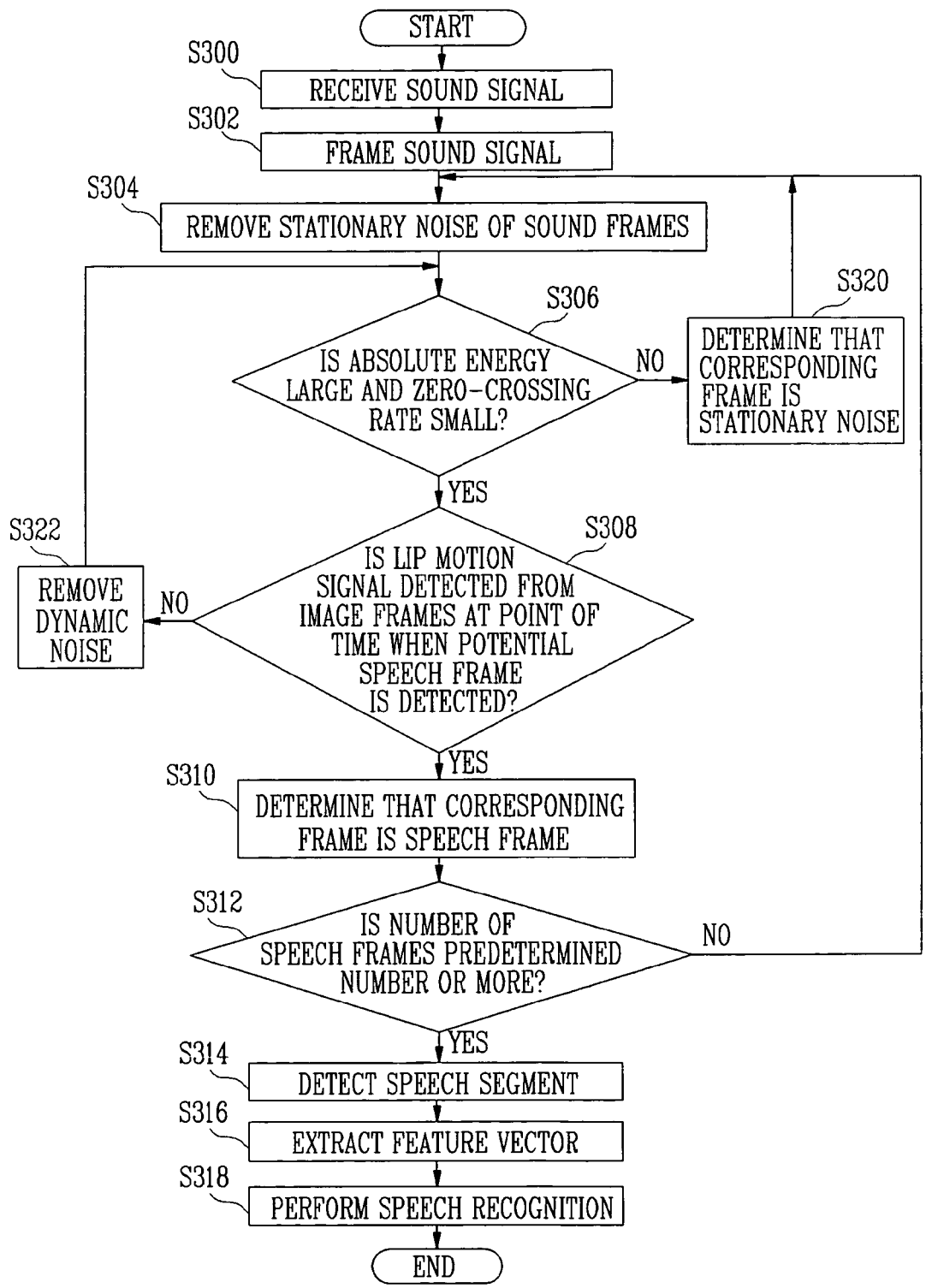
FIG. 3 is a flowchart showing a method for speech segment detection in a speech recognition system according to an exemplary embodiment of the present invention.

FIG. 3 is a flowchart showing a method for speech segment detection in a speech recognition system according to an exemplary embodiment of the present invention.

Referring to FIG. 3, when a sound signal is received in step 300, the speech recognition system converts the sound signal into a digital signal and frames it in step 302.

After step 302, the speech recognition system removes frame-specific stationary noise from the framed sound signal in step 304 and determines whether or not absolute energy of each frame from which noise is removed is large and a zero-crossing rate of the frame is small in step 306.

More specifically, the speech recognition system removes stationary noise characterized by a uniform level and a high frequency from the framed sound signal and then analyzes a level of absolute energy and a zero-crossing rate of each sound frame having residual energy, thereby determining whether the sound frame is a potential speech frame or noise.

When the absolute energy is less than a reference value or the zero-crossing rate is more than a reference value, the speech recognition system determines that the corresponding sound frame is noise. On the contrary, when the absolute energy is more than the reference value and the zero-crossing rate is less than the reference value, the speech recognition system determines that the corresponding sound frame is a potential speech frame.

When it is determined in the step 306 that the absolute energy of the sound frame from which noise is removed is large and the zero-crossing rate of the sound frame is small, the speech recognition system determines whether or not a lip motion signal is detected from image frames at the point of time when the potential speech frame is detected in step 308.

Since a sound frame is matched with an image frame, the speech recognition system can extract image frames at the point of time when the potential speech frame is detected, and determine whether or not a lip motion signal is detected from the image frames.

A method for the speech recognition system to detect a lip motion signal from image frames will be described with reference to FIG. 4.

When it is determined in step 308 that a lip motion signal is detected from the image frames at the point of time when the potential speech frame is detected, the speech recognition system determines that the corresponding sound frame is a speech frame in step 310, and determines whether or not the number of speech frames is a predetermined number or more in step 312.

When it is determined in step 312 that the number of speech frames is the predetermined number or more, the speech recognition system marks an initial frame of the corresponding frames as a beginning point of a speech segment, thereby detecting the speech segment, in step 314.

More specifically, when the number of speech frames exceeds the predetermined number, the speech recognition system marks the initial frame of the speech frames as the beginning point of a speech segment, and makes speech frames that are input thereafter progress to a speech recognition process. When a state in which a speech frame is not input continues, the speech recognition system marks an end point of a speech segment and detects the speech segment.

After step 314, the speech recognition system extracts a feature vector from the detected speech segment in step 316 and performs speech recognition in step 318.

When it is determined in step 306 that the absolute energy of the sound frame from which noise is removed is not large or the zero-crossing rate of the sound frame is not small, the speech recognition system determines that the corresponding frame is noise in step 320 and performs step 304.

When it is determined in step 308 that a lip motion signal is not detected from the image frames at the point of time when the potential speech frame is detected, the speech recognition system determines that the corresponding frames are dynamic noise, removes the dynamic noise in step 322, and then performs step 306.

When the number of speech frames is less than the predetermined number, as a result of the determination of step 312, the speech recognition system determines that the corresponding frames are noise and performs step 304.

Figure 4:
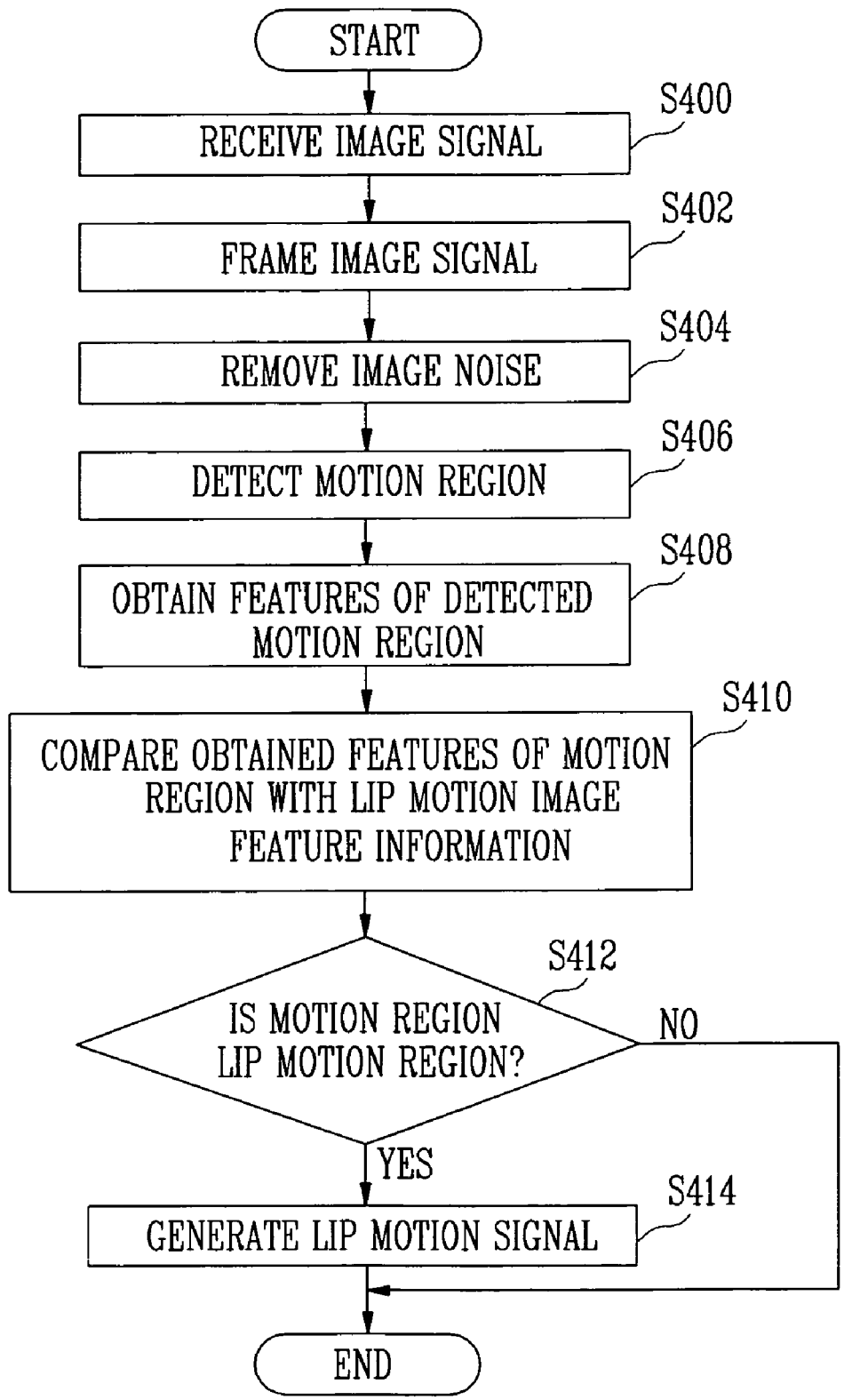
FIG. 4 is a flowchart showing a method for lip motion signal detection in a speech recognition system according to an exemplary embodiment of the present invention.

FIG. 4 is a flowchart showing a method for lip motion signal detection in a speech recognition system according to an exemplary embodiment of the present invention.

Referring to FIG. 4, when an image signal is received through a camera in step 400, the speech recognition system converts the image signal into a digital signal and frames it in step 402.

After step 402, the speech recognition system removes image noise from the framed image signal in step 404, and detects a motion region from the image frames from which image noise is removed in step 406.

In other words, the speech recognition system compares pixel values of a previous frame with respective pixel values of a current frame, thereby detecting a motion region.

After step 406, the speech recognition system obtains features of the detected motion region such as an area, a horizontal length, a vertical length, a width/length ratio, a position, etc. in step 408.

After step 408, the speech recognition system compares the obtained features of the motion region with previously-stored lip motion image feature information in step 410, and determines whether or not the motion region is a lip motion region in step 412.

More specifically, the speech recognition system determines that the motion region is a lip motion region when a degree of similarity is a predetermined value or more, as a result of the comparison between the features of the motion region and the lip motion image feature information, and determines that the motion region is other than a lip motion region or that there is no motion when the degree of similarity is less than the predetermined value. Here, the lip motion image feature information includes a shape of lips and a change in the shape, i.e., a width and area of a lip feature point, changes therein according to time, and so on.

When the motion region is a lip motion region, as a result of the determination of step 412, the speech recognition system generates a lip motion signal in step 414.

The lip motion signal generated in this manner is used to determine whether or not a sound frame is a speech frame, as illustrated in FIG. 3.

As described above, the present invention can be implemented as a program and stored in a recording medium in a form readable by computers. Such a process can be easily performed by those skilled in the field of technology with which the present invention is concerned, and thus a detailed description thereof will be omitted.

As described above, according to the present invention, it is possible to provide an apparatus and method for speech segment detection and a system for speech recognition capable of preventing dynamic noise from being misrecognized as speech by checking lip motion image information in a speech segment detection process.

In addition, according to the present invention, it is possible to provide an apparatus and method for speech segment detection and a system for speech recognition capable of improving a speech recognition rate by removing dynamic noise in a speech segment detection process.

In addition, according to the present invention, it is possible to provide an apparatus and method for speech segment detection and a system for speech recognition capable of conserving resources by preventing unnecessary operation caused by noise.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for speech segment detection including a sound receiver and an image receiver, the apparatus comprising:
    a lip motion signal detector for detecting a motion region from image frames output from the image receiver, applying lip motion image feature information to the detected motion region, and detecting a lip motion signal for determining whether or not a sound frame is a speech frame; and
    a speech segment detector for detecting a speech segment using sound frames output from the sound receiver and the lip motion signal detected from the lip motion signal detector, the speech segment detector determining whether the sound frame is a potential speech frame or is stationary noise, and when it is determined that the sound frame is a potential speech frame, determining whether the potential speech frame is a speech frame or dynamic noise according to the lip motion signal.

2. The apparatus of claim 1, wherein the lip motion signal detector compares the image frames output from the image receiver with each other, detects a motion region, obtains information on an area, width, length, and position of the detected motion region, compares the obtained features of the motion region with previously stored lip motion image feature information, and detects the lip motion signal.

3. The apparatus of claim 1, wherein the speech segment detector determines whether or not each sound frame input from the sound receiver is a potential speech frame using absolute energy and zero-crossing rate of the sound frame, determines whether or not the lip motion signal is detected from the image frames at a point of time when the determined potential speech frame is detected, and detects the speech segment.

4. A method for speech segment detection in a speech recognition system including a sound receiver and an image receiver, the method comprising the steps of:

removing stationary noise from a sound frame output from the sound receiver, and determining whether or not the sound frame from which the noise is removed is a potential speech frame;

when it is determined that the sound frame is a potential speech frame, determining whether or not a lip motion signal is detected from image frames at a point of time when the potential speech frame is detected;

when it is determined that the lip motion signal is detected from the image frames, determining that the potential speech frame is a speech frame, storing the speech frame, and determining whether or not the number of speech frames is at least a predetermined number; and when it is determined that the number of speech frames is at least the predetermined number, detecting the speech frames as a speech segment.

5. The method of claim 4, wherein in the step of removing stationary noise from a sound frame output from the sound receiver, low-pass filtering is performed for the sound frame and a high frequency component is removed.

6. The method of claim 4, wherein in the step of determining whether or not the sound frame from which noise is removed is a potential speech frame, a level of absolute energy of the sound frame from which the noise is removed and a zero-crossing rate of the sound frame are analyzed, and it is determined whether the sound frame is a potential speech frame or a noise frame.

7. The method of claim 4, wherein the step of determining whether or not a lip motion signal is detected from image frames at a point of time when the potential speech frame is detected comprises the steps of:

respectively comparing pixel values of a previous frame with pixel values of a current frame among the continuously received image frames, and detecting a motion region;

obtaining information on an area, width, length, and location of each detected motion region; and applying lip motion image feature information to the obtained features of the motion region, determining whether or not the motion region is a lip motion region, and generating the lip motion signal according to the determination result.

8. The method of claim 7, wherein the lip motion image feature information comprises a shape of lips and a change in the shape.

9. The method of claim 7, wherein the step of applying lip motion image feature information to the obtained features of the motion region, determining whether or not the motion region is a lip motion region, and generating the lip motion signal according to the determination result comprises the steps of:

comparing the obtained features of the motion region with the lip motion image feature information and calculating a degree of similarity; and when the calculated degree of similarity is at least a predetermined value, determining that the motion region is the lip motion region and generating the lip motion signal.

10. The method of claim 4, when it is determined that a lip motion signal is not detected from the image frames, further comprising the step of determining that the potential speech frame is dynamic noise.

11. A system for speech recognition, comprising:

a sound receiver for converting a sound signal input by a user into a digital signal and framing the digital signal;

an image receiver for framing an image signal obtained by an image recorder;

a lip motion signal detector for detecting a motion region from the image frames output from the image receiver, applying lip motion image feature information to the detected motion region, and detecting a lip motion signal;

a speech segment detector for determining whether the sound frame output from the sound receiver is a potential speech frame or is stationary noise, and when it is determined that the sound frame is a potential speech frame, detecting a speech segment according to the lip motion signal detected by the lip motion signal detector;

a feature vector extractor for extracting a feature vector from the speech segment detected by the speech segment detector; and a speech recognizer for performing speech recognition using the feature vector extracted by the feature vector extractor to convert the sound signal to characters.

12. The system of claim 11, wherein the image recorder is a camera.

* * * * *